US012627010B2

(12) United States Patent (10) Patent No.: US 12,627,010 B2
Park                                    (45) Date of Patent:      May 12, 2026

(54) BATTERY PACK

(71) Applicant: Samsung SDI Co., Ltd., Yongin-si (KR)

(72) Inventor: Sanghun Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 728 days.

(21) Appl. No.: 18/150,153

(22) Filed: Jan. 4, 2023

(65) Prior Publication Data

US 2023/0216158 A1      Jul. 6, 2023

(30) Foreign Application Priority Data

Jan. 5, 2022    (KR) ........................ 10-2022-0001632

(51) Int. Cl.
H01M 50/574          (2021.01)
(52) U.S. Cl.
CPC ................................ H01M 50/574 (2021.01)
(58) Field of Classification Search
CPC ............. H01M 50/574; H01M 50/284; H01M 50/287; H01M 50/519; H01M 10/48
See application file for complete search history.

(56) References Cited

U.S. PATENT DOCUMENTS

| 8,709,622 | B2 | 4/2014 | Jang et al. |
| 10,263,238 | B2 | 4/2019 | Hwang et al. |

| 11,695,285 | B2 | 7/2023 | Choi | |
| 2011/0086242 | A1 | 4/2011 | Lee | |
| 2017/0285090 | A1 | 10/2017 | Dietze et al. | |
| 2021/0179624 | A1 | 6/2021 | Choi | |
| 2023/0216158 | A1 | 7/2023 | Park | |
| 2024/0274961 | A1* | 8/2024 | Sheng | H01M 50/503 |

FOREIGN PATENT DOCUMENTS

| CN | 111295777 | A | 6/2020 |
| CN | 211404549 | U | 9/2020 |
| CN | 111989812 | A | 11/2020 |
| CN | 112952179 | A | 6/2021 |

(Continued)

OTHER PUBLICATIONS

CN 111295777 English translation. Choi et al. China. Jun. 16, 2020. (Year: 2020).*

(Continued)

*Primary Examiner* — Christopher P Domone
(74) *Attorney, Agent, or Firm* — Womble Bond Dickinson (US) LLP

(57)                    ABSTRACT

A battery pack, includes: a battery cell comprising a main body comprising an electrode assembly, and a terrace part from which electrodes connected to the electrode assembly are drawn out; and a protection module package seated on the terrace part of the battery cell and electrically connected to the battery cell, wherein the protection module package includes: a circuit board includes: a first surface facing the terrace part of the battery cell; a second surface opposite to the first surface; a third surface, which is between the first and second surfaces and faces the main body of the battery cell; and a fourth surface opposite to the third surface and on which a test port is formed; and a connection tab connecting the battery cell to the circuit board.

20 Claims, 7 Drawing Sheets

(56)         References Cited

FOREIGN PATENT DOCUMENTS

| | | | |
|---|---|---|---|
| CN | 219553834 | U | 8/2023 |
| DE | 102017106680 | A1 | 10/2017 |
| JP | 3636897 | B2 | 1/2005 |
| KR | 10-2006-0085874 | A | 7/2006 |
| KR | 10-0959871 | B1 | 5/2010 |
| KR | 10-2011 0038914 | A | 4/2011 |
| KR | 10-1474741 | B1 | 12/2014 |
| KR | 10-1638113 | B1 | 7/2016 |
| KR | 10-2018-0137313 | A | 12/2018 |
| KR | 10-2019-0140581 | A | 12/2019 |
| KR | 10-2021-0073884 | A | 6/2021 |

OTHER PUBLICATIONS

International Search Report dated Apr. 10, 2023, issued in PCT International Application No. PCT/KR2023/000232 (3 pages).
Chinese Office Action corresponding to CN Application No. 202310013787.4, dated Aug. 30, 2025 (7 pages).
Extended European Search Report issued in corresponding EP Application No. 23737406.1, dated Nov. 21, 2025 (8 pages).
Chinese Office Action corresponding to CN Application No. 202310013787.4, dated Feb. 13, 2026 (6 pages).

\* cited by examiner

BATTERY PACK

CROSS-REFERENCE TO RELATED APPLICATION

The present application claims priority to and the benefit of Korean Patent Application No. 10-2022-0001632, filed on Jan. 5, 2022, in the Korean Intellectual Property Office, the entire disclosure of which is incorporated herein by reference.

BACKGROUND

1. Field

Aspects of one or more embodiments relate to a battery pack.

2. Description of the Related Art

In general, secondary batteries are rechargeable (e.g., configured to be repeatedly charged and discharged) unlike non-rechargeable primary batteries. Secondary batteries are used as energy sources of devices, such as mobile devices, electric vehicles, hybrid vehicles, electric bicycles, or uninterruptible power supplies, and depending on the type of an external device using a secondary battery, the secondary battery may be used as a single battery cell or as a module in which a plurality of battery cells are connected to each other to constitute a unit.

The above information disclosed in this Background section is only for enhancement of understanding of the background and therefore the information discussed in this Background section does not necessarily constitute prior art.

SUMMARY

Aspects of some embodiments include a battery pack with sufficient mounting spaces for circuit components, such as connection tabs or circuit elements, and including a test port that enables various purposes, such as inspecting an electrical connection state, checking a normal operation, or measuring a voltage of a battery cell.

Additional aspects will be set forth in part in the description which follows and, in part, will be apparent from the description, or may be learned by practice of the presented embodiments of the disclosure.

According to one or more embodiments, a battery pack includes a battery cell comprising a main body, including an electrode assembly, and a terrace part from which electrodes connected to the electrode assembly are drawn out, and a protection module package seated on the terrace part of the battery cell and electrically connected to the battery cell, wherein the protection module package comprises a circuit board including a first surface facing the terrace part of the battery cell, a second surface opposite to the first surface, a third surface, which is between the first and second surfaces and faces the main body of the battery cell, and a fourth surface opposite to the third surface and on which a test port is formed, and a connection tab connecting the battery cell to the circuit board.

According to some embodiments, the first to fourth surfaces of the circuit board may extend in a longitudinal direction of the circuit board, and include different adjacent surfaces to be in contact with each other.

According to some embodiments, the first and second surfaces of the circuit board may form main surfaces of the circuit board occupying a relatively large area, and the third and fourth surfaces of the circuit board may form side surfaces of the circuit board occupying a relatively small area.

According to some embodiments, the connection tab and a circuit element may mounted on at least one of the first and second surfaces of the circuit board.

According to some embodiments, the connection tab may be arranged on the second surface of the circuit board and drawn out from an edge that is in contact with the fourth surface of the circuit board.

According to some embodiments, a thickness of the test port formed on the fourth surface of the circuit board may be less than a thickness of the circuit element formed on the second surface of the circuit board.

According to some embodiments, the test port may include a metal layer connected to a conductive pattern extending toward the fourth surface of the circuit board, among a plurality of conductive patterns formed on the circuit board.

According to some embodiments, the test port may include a plating layer formed on an end of a conductive pattern that extends toward the fourth surface of the circuit board.

According to some embodiments, the battery pack may further include an input/output port for input/output of a charging/discharging current of the battery cell with respect to an external device connected to the battery pack, and the test port may be formed in a shape different from a shape of the input/output port.

According to some embodiments, the test port may be formed to have a smaller area than an area of the input/output port.

According to some embodiments, the input/output port may be formed at an end of a flexible wiring that extends from the circuit board in a longitudinal direction of the circuit board.

According to some embodiments, a connection area with the circuit board may be formed at one end of the flexible wiring, and the input/output port may be formed at the other end of the flexible wiring.

According to some embodiments, the connection area may be formed on any one of the first and second surfaces of the circuit board.

According to some embodiments, the protection module package may further include an insulating block covering at least one of the first to fourth surfaces of the circuit board.

According to some embodiments, the insulating block may include a side surface formed with a plurality of bridges extending across the fourth surface in a longitudinal direction of the circuit board with long holes therebetween, to cover the first and second surfaces and expose a portion of the fourth surface on which the test port is formed.

According to some embodiments, the insulating block may include first to fourth layers formed on the first to fourth surfaces of the circuit board, respectively.

According to some embodiments, the first to third layers of the insulating block may entirely cover the first to third surfaces of the circuit board.

According to some embodiments, the fourth layer of the insulating block may include the plurality of bridges connecting the first and second layers of the insulating block to each other.

According to some embodiments, the plurality of bridges and the long holes may be alternately formed in a longitudinal direction of the circuit board.

According to some embodiments, the test port may be exposed from the insulating block through the long holes.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Figure 1:
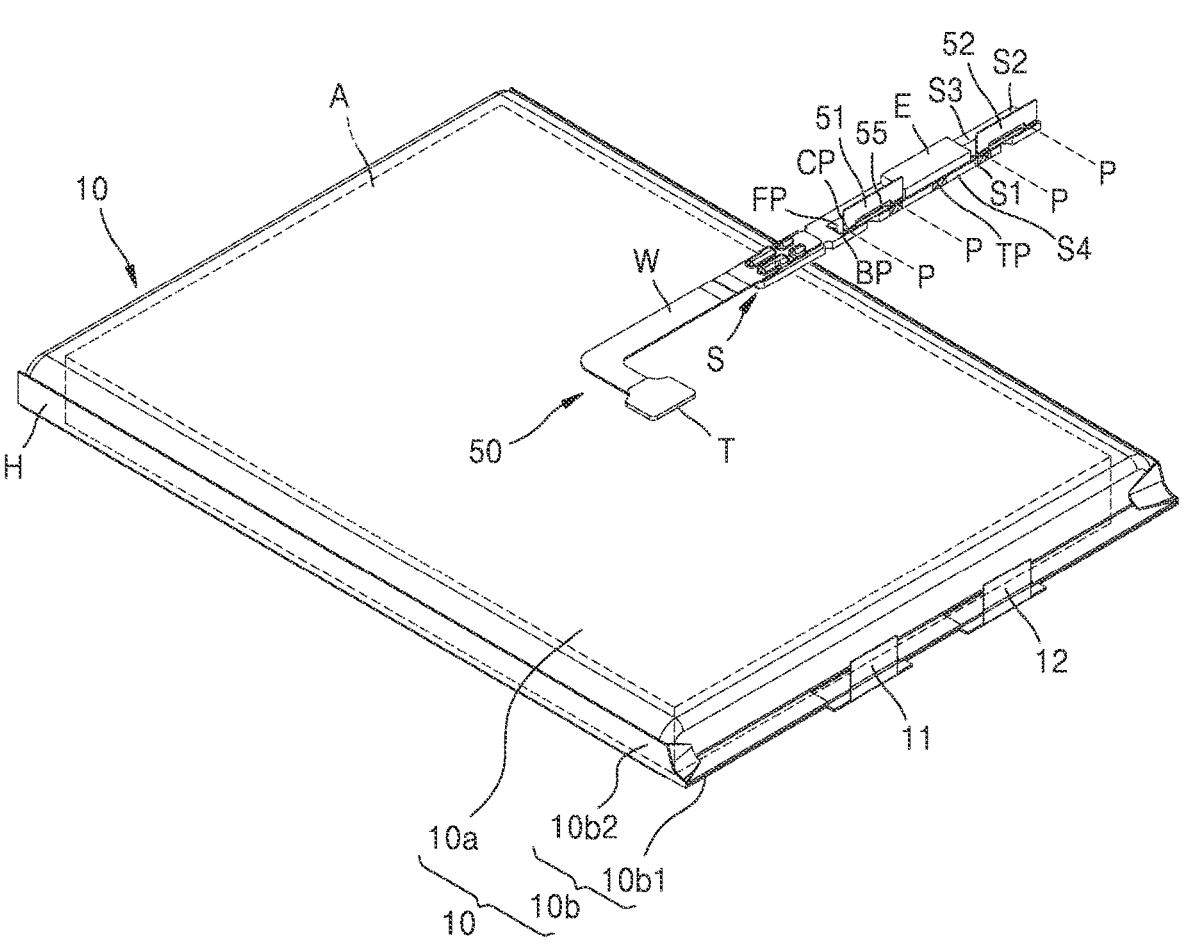
FIG. 1 is an exploded perspective view of a battery pack according to some embodiments.

Reference will now be made in more detail to aspects of some embodiments, which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, aspects of a battery pack according to some embodiments will be described in more detail with reference to the accompanying drawings.

Figure 2:
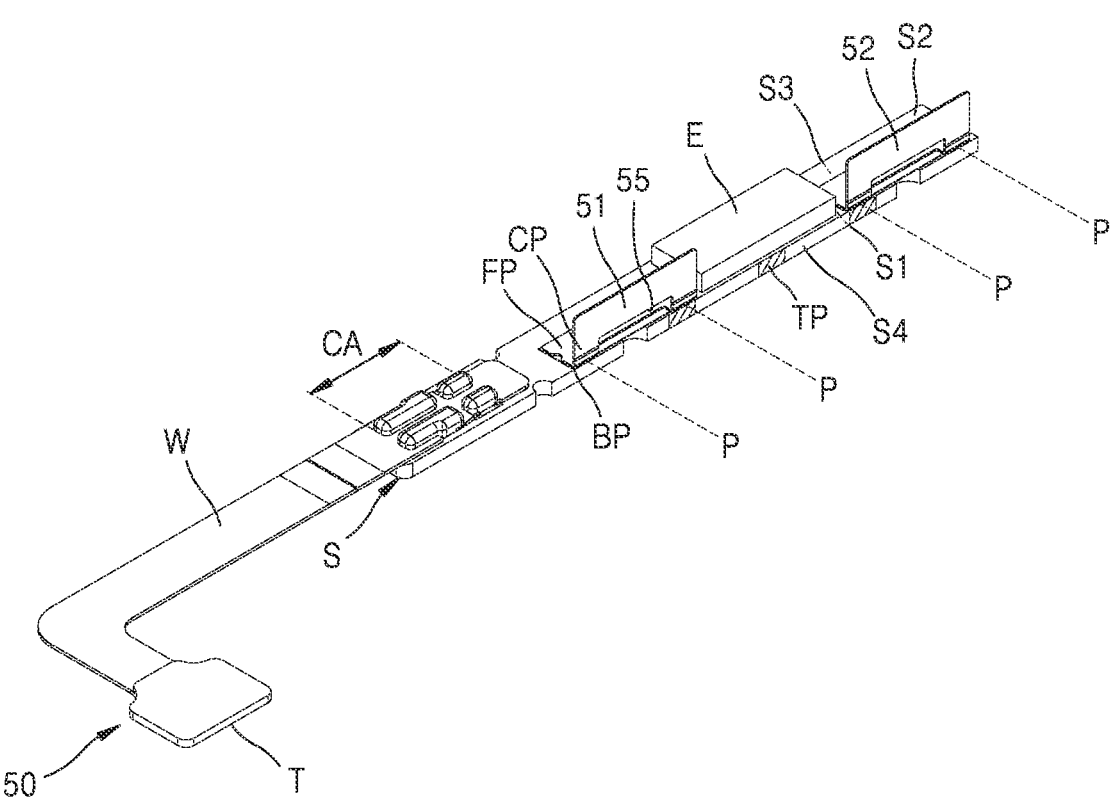
FIG. 2 is a perspective view of a protection module package illustrated in FIG. 1 according to some embodiments.
Figure 3:
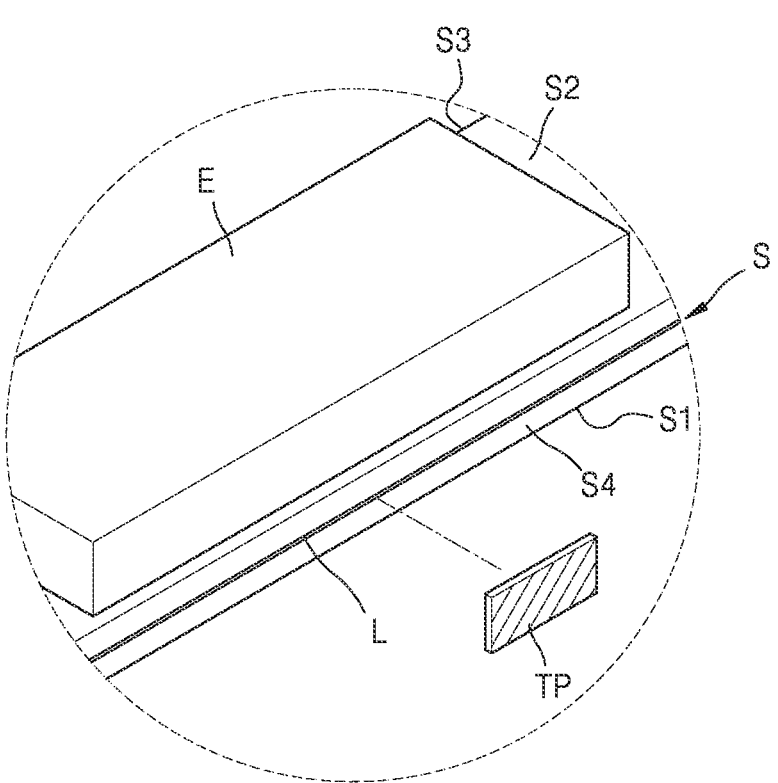
FIG. 3 is an exploded perspective view illustrating further details of a test port illustrated in FIG. 2 according to some embodiments.

FIG. 1 is an exploded perspective view of a battery pack according to some embodiments. FIG. 2 is a perspective view of a protection module package illustrated in FIG. 1. FIG. 3 is an exploded perspective view illustrating further details of a test port illustrated in FIG. 2 according to some embodiments.

Referring to FIGS. 1 to 3, a battery pack according to some embodiments may include a battery cell 10 including a main body 10a including an electrode assembly A, and a terrace part 10b1 from which electrodes 11 and 12 connected to the electrode assembly A are drawn out, and a protection module package 50 seated on the terrace part 10b1 of the battery cell 10 and electrically connected to the battery cell 10, and the protection module package 50 may include a circuit board S including a first surface S1 facing the terrace part 10b1 of the battery cell 10, a second surface S2 opposite to the first surface S1, a third surface S3, which is between the first and second surfaces S1 and S2 and faces the main body 10a of the battery cell 10, and a fourth surface S4 opposite to the third surface S3 and on which a test port TP is formed. The battery pack according to some embodiments may further include connection tabs 51 and 52, which connect the battery cell 10 and the circuit board S to each other and are arranged on the second surface S2 to be drawn out from an edge that is in contact with the fourth surface S4.

Referring to FIG. 1, the battery cell 10 may include the electrode assembly A, a casing H surrounding the electrode assembly A, and the electrodes 11 and 12 drawn out from the casing H. According to some embodiments, the electrode assembly A may be formed in a winding type in which first and second electrode plates and a separator between the first and second electrode plates are wound in a roll shape, or may be formed in a stack type in which first and second electrode plates and a separator are stacked with respect to each other. The first and second electrode plates of the electrode assembly A may be electrically connected to the outside of the casing H through the electrodes 11 and 12 of the battery cell 10, and the electrodes 11 and 12 of the battery cell 10 may be electrically connected to the first and second electrode plates of the electrode assembly A, respectively, and may include the first electrode 11 and the second electrode 12 having different polarities. The electrodes 11 and 12 may be drawn out through the terrace part 10b1 of the battery cell 10, and may be electrically connected to the protection module package 50 as will be described below.

The casing H may surround the electrode assembly A, and by sealing the excess portion of the casing H remaining after surrounding the electrode assembly A, a sealing part 10b for sealing the electrode assembly A may be formed. In this case, the battery cell 10 may include the main body 10a including the electrode assembly A and the casing H surrounding the electrode assembly A, and the sealing part 10b formed along the periphery of the main body 10a and including the casing H for sealing the electrode assembly A. In this case, the sealing part 10b may include the terrace part 10b1 from which the electrodes 11 and 12 are drawn out, and may include, in addition to the terrace part 10b1, a side sealing part 10b2 formed along a side of the main body 10a of the battery cell 10.

Referring to FIGS. 1 to 3, the protection module package 50 electrically connected to the battery cell 10 may be seated on the terrace part 10b1 of the battery cell 10. The protection module package 50 may include the circuit board S electrically connected to the battery cell 10. The circuit board S may be electrically connected to the battery cell 10 to form a path for a charging/discharging current of the battery cell 10, and may perform a protective operation to prevent overheating or explosion caused by overheating, overcharging, or overdischarging of the battery cell 10.

The circuit board S may include the first and second surfaces S1 and S2 for providing a mounting space for the connection tabs 51 and 52 connected to the electrodes 11 and 12 of the battery cell 10 and circuit elements E for performing the protective operation for the battery cell 10. According to some embodiments, the first and second surfaces S1 and S2 may correspond to main surfaces occupying the largest area in the circuit board S, and the first and second surfaces S1 and S2 may correspond to a pair of main surfaces opposite to each other. In various embodiments, the connection tabs 51 and 52 or the circuit elements E may be intensively arranged on any one of the first and second surfaces S1 and S2 of the circuit board S, or may be distributed on the first and second surfaces S1 and S2 of the circuit board S. According to some embodiments of the present, the connection tabs 51 and 52 and the circuit elements E may be arranged on the second surface S2 of the circuit board S, which is opposite to the terrace part 10b1 of the battery cell 10 and is more advantageous in terms of insulation from the battery cell 10, rather than on the first surface S1 facing the terrace part 10b1 of the battery cell 10, among the first and second surfaces S2 forming the main surfaces of the circuit board S.

According to some embodiments, the first and second surfaces S1 and S2 of the circuit board S may correspond to opposite main surfaces of the circuit board S, respectively, and the terrace part of the battery cell 10, and may correspond to a surface facing the terrace part 10b1 of the battery cell 10, and a surface opposite to the terrace part 10b1 of the battery cell 10, respectively. That is, the protection module package 50 including the circuit board S may be seated on the terrace part 10b1 of the battery cell 10, and in this case, the protection module package 50 may be seated on the terrace part 10b1 such that the first surface S1 of the circuit board S faces the terrace part 10b1. As the first surface S1 forming the main surface of the circuit board S is arranged to face the terrace part 10b1, the protection module package 50 including the circuit board S may be stably mounted on the terrace part 10b1.

The circuit board S may further include the third and fourth surfaces S3 and S4 connecting the first and second surfaces S1 and S2 to each other. In this case, the third and fourth surfaces S3 and S4 may correspond to opposite surfaces of the circuit board S, and may corresponds to side surfaces occupying narrower areas than the first and second surfaces S2 forming the main surfaces.

According to some embodiments, the first to fourth surfaces S1, S2, S3, and S4 of the circuit board may correspond to different adjacent surfaces extending along the longitudinal direction of the circuit board S and in contact with each other. Throughout the present specification, the longitudinal direction of the circuit board S may correspond to the direction in which the circuit board S extends, for example, the longitudinal direction of the terrace part 10b1 of the battery cell 10, and may correspond to a direction crossing the electrodes 11 and 12 extending from the terrace part 10b1.

According to some embodiments, the first to fourth surfaces S1, S2, S3, and S4 of the circuit board S may correspond to adjacent outer surfaces of the circuit board S extending along the longitudinal direction of the circuit board S while forming edges in contact with each other, and the circuit board S may be generally formed in the shape a rectangular parallelepiped including the first to fourth surfaces S1, S2, S3, and S4.

The third and fourth surfaces S3 and S4 of the circuit board S may correspond to a surface facing the main body 10a of the battery cell 10, and a surface opposite to the main body 10a of the battery cell 10, respectively. The protection module package 50 including the circuit board S may be seated on the terrace part 10b1 of the battery cell 10, such that the third surface S3 of the circuit board S faces the main body 10a of the battery cell 10. The fourth surface S4 of the circuit board S corresponds to the surface opposite to the main body 10a of the battery cell 10, and may include the test port TP that provides an electrical contact for a test probe to inspect an electrical connection state of the circuit board S and check whether the circuit board S operates normally. That is, according to some embodiments, for the purpose of inspecting the electrical connection state and checking whether the circuit board S operates normally, or for measuring a voltage or the like of the battery cell 10, the test port TP may be formed on the fourth surface S4 of the circuit board S that is opposite to the main body 10a of the battery cell 10, to facilitate access by the test probe from the outside.

According to some embodiments, by bringing the test probe that is external to the battery pack into electrical contact with the test port TP formed on the fourth surface S4, which is farthest from the battery cell 10 among the first to fourth surfaces S1, S2, S3, and S4 of the circuit board S, it may be possible to inspect the electrical connection state of the circuit board S, check whether the circuit board S operates normally, and measure a voltage of the battery cell 10 that have not passed through the circuit board S.

According to some embodiments, the test port TP may be formed at a position that is not affected by interference from the battery cell 10, and for example, the fourth surface S4 of the circuit board S on which the test port TP is formed may be formed at a position that is not affected by interference from the battery cell 10. Here, that the fourth surface S4 of the circuit board S on which the test port TP is formed is formed at a position that is not affected by interference from the battery cell 10 may mean that, unlike the first surface S1 facing the terrace part 10b1 of the battery cell 10 or the third surface S3 facing the main body 10a of the battery cell 10, the test probe may relatively easily access to the test port TP from the outside of the battery pack by avoiding the interference from the battery cell 10, and thus, electrical contact with the test probe may be made substantially without interference from the battery cell 10.

According to some embodiments, the connection tabs 51 and 52 and the circuit elements E may be mounted on the second surface S2 of the circuit board S, and the test port TP may not be formed on the second surface S2 of the circuit board S, but may be formed on the fourth surface S4 of the circuit board S such that a mounting space is secured on the second surface S2 of the circuit board S and a plurality of circuit components are mounted by using the secured mounting space. As used herein, the circuit components includes the circuit elements E that have internal circuits and comprehensively means the connection tabs 51 and 52 that do not have any internal circuit, and, for example, may comprehensively mean components that are connected to other circuit components to form an electrical path.

For example, unlike the first surface S1 facing the terrace part 10b1 of the battery cell 10 and the third surface S3 facing the main body 10a of the battery cell 10, the second surface S2 and the fourth surface of the circuit board S may enable the test probe to approach them from the outside while avoiding the interference from the battery cell 10, but the test port TP may be formed on the fourth surface S4 of the circuit board S rather than on the second surface S2, which is a main surface of the circuit board S with a relatively large area and thus may provide a mounting space for a plurality of circuit components, so as to secure the sufficient mounting space on the second surface S2, such that the plurality of circuit components are mounted in the mounting space on the second surface S2 without spatial restrictions, and thus, a charging/discharging operation of the battery cell 10 is more efficiently controlled.

According to some embodiments, the test port TP may correspond to an electrode pad forming one end of a conductive pattern L electrically connected to the connection tabs 51 and 52, and, because, for example, the test port TP may be formed to have a thickness less than that of the circuit elements E mounted on the main surface of the circuit board S (i.e., the first or second surface S1 or S2 of the circuit board S), by considering the overall space efficiency of the battery pack, the circuit elements E formed with a relatively high thickness may be installed on, the first or second surface S1 or S2 of the circuit board S in which a sufficient mounting space may be secured by the height of the main body 10a of the battery cell 10, whereas the test port TP formed to have a relatively low thickness may be formed on the fourth surface S4 of the circuit board S.

According to some embodiments, the circuit elements E mounted on the first or second surface S1 or S2 of the circuit board S may constitute a relatively high thickness of the first or second surface S1 or S2 of the circuit board S, but may not add an additional height to the height of the main body 10a of the battery cell 10 by being accommodated in the mounting space secured by the height of the main body 10a of the battery cell 10, and the test port TP may be formed on the fourth surface S4 of the circuit board S, to have a relatively low thickness without substantially forming a protrusion from the fourth surface S4 of the circuit board S, and thus may not increase the overall volume of the battery pack. According to some embodiments, that the test port TP is formed on the fourth surface S4 of the circuit board S to have a relatively low thickness or that the test port TP does not substantially form a protrusion from the fourth surface S4 may mean that the test port TP may include a thin metal layer formed on the fourth surface S4 of the circuit board S.

According to some embodiments, as the energy density of the battery cell 10 increases, the height of the main body 10a of the battery cell 10 also increases, thus, the height of the main body 10a of the battery cell 10 may increase in proportion to the energy density of the battery cell 10 to secure increased mounting spaces on the first and second surfaces S1 and S2 of the circuit board S, such that more circuit components may be mounted to efficiently operate the battery cell 10 having a high energy density, and the circuit elements E having an increased size according to a required processing capacity may be mounted. According to some embodiments, by forming the test port TP on the fourth surface S4 connecting the first and second surfaces S1 and S2 to each other, rather on the first and second surfaces S1 and S2 corresponding to the main surfaces of the circuit board S, it may be possible to secure mounting spaces on the first and second surfaces S1 and S2 for circuit components, and thus mount more circuit components with high performance in the secured mounting spaces, and thus, a structure advantageous for a battery pack having a high energy density may be provided.

Regarding the mounting space for the circuit components, the circuit components may not be mounted on, among the first to fourth surfaces S1, S2, S3, and S4 of the circuit board S, the first surface S1 of the circuit board S facing the terrace part 10b1 of the battery cell 10 or the third surface S3 of the circuit board S facing the main body 10a of the battery cell 10 in order to avoid an electrical short circuit between the circuit components and the battery cell 10 and to be advantageous for electrical insulation between the circuit components and the battery cell 10. However, according to some embodiments, the circuit components may be mounted on any of the first to fourth surfaces S1, S2, S3, and S4 of the circuit board S, may be mounted mainly on the second surface S2 of the circuit board S, or may be mounted on the first surface S1, the third surface S3, the fourth surface S4, or the like, in addition to the second surface S2 to provide an extra mounting space.

According to some embodiments, the circuit board S may include a plurality of conductive patterns L, and the test port TP may include a metal layer connected to the conductive pattern L among the plurality of conductive patterns L, which extends toward the fourth surface S4 of the circuit board S, and for example, may include a metal layer directly formed on the conductive pattern L extending toward the fourth surface S4 of the circuit board S. According to some embodiments, the test port TP may include a thin metal layer formed by plating on one end of the conductive pattern L electrically connected to the connection tabs 51 and 52.

According to some embodiments, the circuit board S may include the first and second conductive patterns L connected to the first and second connection tabs 51 and 52 formed on the circuit board S, and the first and second conductive patterns L may extend toward the fourth surface S4 to be connected to the test port TP formed on the fourth surface S4. For example, the test port TP may include a pair of test ports TP formed at ends of the first and second conductive patterns L exposed on the fourth surface S4 of the circuit board S. However, according to some embodiments, the test port TP may be formed for various purposes, such as inspection, checking, measurement, for example, inspecting the electrical connection state of the circuit board S, checking the operation of the circuit board S, or measuring a voltage of the battery cell 10, and may further include an additional test port TP, in addition to the pair of test ports TP connected to the first and second connection tabs 51 and 52. Throughout the present specification, the test port TP may collectively refer to a port that is electrically connected to the circuit board S without the purpose of input/output of a charging/discharging current of the battery cell 10 and is formed to be exposed to the outside.

According to some embodiments, the test port TP may be formed in a shape different from that of an input/output port T for inputting and outputting the charging/discharging current of the battery cell 10. According to some embodiments, the test port TP may be formed as a plate-shaped metal layer exposed on the fourth surface S4 of the circuit board S, and may be formed as a flat thin metal layer to be in contact with the test probe formed in a pointed needle shape. On the contrary, the input/output port T may be formed at an end of a flexible wiring W extending from the circuit board S, and for example, the input/output port T may have a pin structure protruding toward the outside or a hole structure concavely drawn toward the inside, for connection with an external device, which a counterpart of the connection of the battery pack, that is, an external charger or an external load. Also, the test port TP may have a smaller area than that of the input/output port T connected to the external device. For example, according to some embodiments, the input/output port T may be formed to have a relatively large area for the purpose of reducing contact resistance with the external device, whereas the test port TP may be formed to have a relatively small area because it is sufficient if it is formed to have an area for accommodating the sharp tip of the test port TP, which is the counterpart of the connection.

According to some embodiments, the input/output port T is formed at one end of the flexible wiring W extending from the circuit board S along the longitudinal direction of the circuit board S, however, in various embodiments, the input/output port T may be formed on the first or second surface S1 or S2 occupying a relatively large area of the circuit board S, and, unlike the input/output port T, the test port TP may be formed on the fourth surface S4 occupying a relatively small area, rather than on the first or second surface S1 or S2 forming the main surfaces of the circuit board S, to have a smaller area than that of the input/output port T, and thus may not increase the volume of the entire battery pack including the circuit board S.

The connection tabs 51 and 52 electrically connected to the battery cell 10 may be arranged on the circuit board S.

According to some embodiments, the connection tabs 51 and 52 may be arranged on the second surface S2 of the circuit board S to be drawn out of the circuit board S, from an edge that is in contact with the fourth surface S4. In this case, the connection tabs 51 and 52 drawn out of the circuit board S may be connected to the electrodes 11 and 12 of the battery cell 10. The connection tabs 51 and 52 may be arranged on the second surface S2 of the circuit board S to be drawn out of the circuit board S, from an edge in which the second surface S2 and the fourth surface S4 are in contact with each other. In this case, the connection tabs 51 and 52 may be drawn out of the circuit board S in a direction parallel to the fourth surface S4 of the circuit board S, and overlap the electrodes 11 and 12 of the battery cell 10 extending in the direction parallel to the fourth surface S4 of the circuit board S while surrounding the circuit board S, to be connected to the electrodes 11 and 12 of the battery cell 10.

Referring to FIG. 2, each of the connection tabs 51 and 52 may include a fixed piece FP fixed on the second surface S2 of the circuit board S, and a coupling piece CP arranged on a different plane from the fixed piece FP through a bent piece BP. The electrodes 11 and 12 of the battery cell 10 extending while surrounding the circuit board S may be coupled to the coupling piece CP.

For example, the fixed pieces FP of the connection tabs 51 and 52 may be arranged on a plane parallel to the second surface S2, and the coupling pieces CP of the connection tabs 51 and 52 may be arranged on a plane parallel to the fourth surface S4. Throughout the present specification, it is mainly described that the coupling pieces CP of the connection tabs 51 and 52 are arranged on the plane parallel to the fourth surface S4, but according to some embodiments, the coupling pieces CP may be arranged on other planes than the second surface S2, including the fourth surface S4.

The bent piece BP may be bent such that the fixed piece FP and the coupling piece CP are arranged on different planes, and form tab withdrawal positions P drawn out of the circuit board S. A pair of bent pieces BP may be formed with a cut-out part 55 therebetween considering ease of bending. In other words, a pair of bent pieces BP and a pair of tab withdrawal positions P may be formed with the cut-out part 55 of the connection tab 51 or 52 therebetween.

The flexible wiring W may be connected to one end of the circuit board S in the longitudinal direction of the circuit board S. A connection area CA with the circuit board S may be formed at one end of the flexible wiring W, and the input/output port T of the battery pack may be formed at the other end of the flexible wiring W. In other words, the connection area CA with the flexible wiring W may be formed on any one of the first and second surfaces S1 and S2 of the circuit board S, and may be formed on the second surface S2 opposite to the terrace part 10b1 of the battery cell 10 considering electrical insulation from the battery cell 10. For example, the connection area CA may include a soldering material formed between the circuit board S and the flexible wiring W. The circuit board S may be formed as a rigid circuit board having the conductive pattern L formed on an insulating substrate forming the base of the circuit board S, and the flexible wiring W may be formed as a flexible circuit board having a conductive pattern formed on a flexible insulating film forming the base of the flexible wiring W. According to some embodiments, the circuit board S including the fourth surface S4 on which the test port TP is formed may be a rigid circuit board rather than a flexible circuit board.

Figure 4:
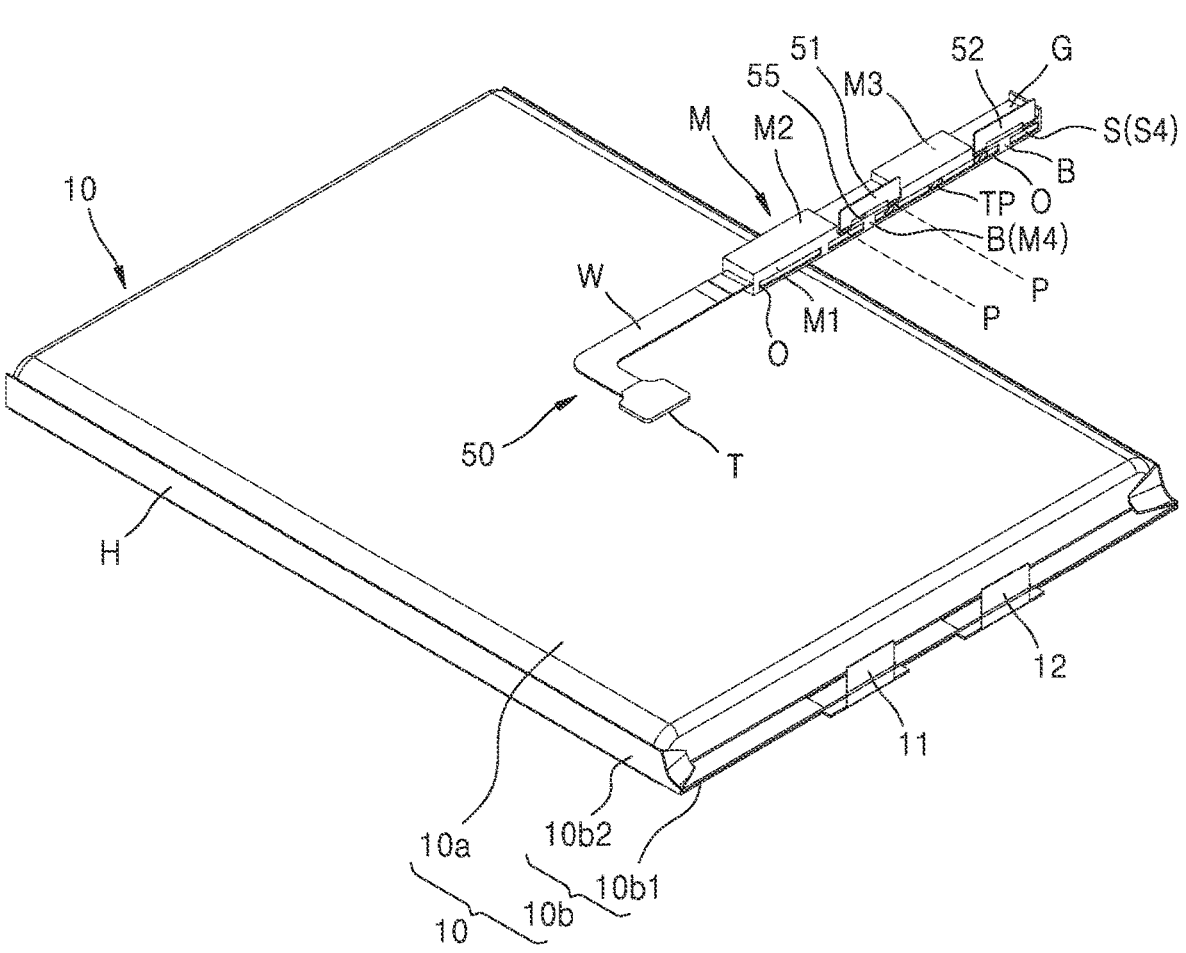
FIG. 4 is an exploded perspective view of a battery pack according to some embodiments.
Figure 5:
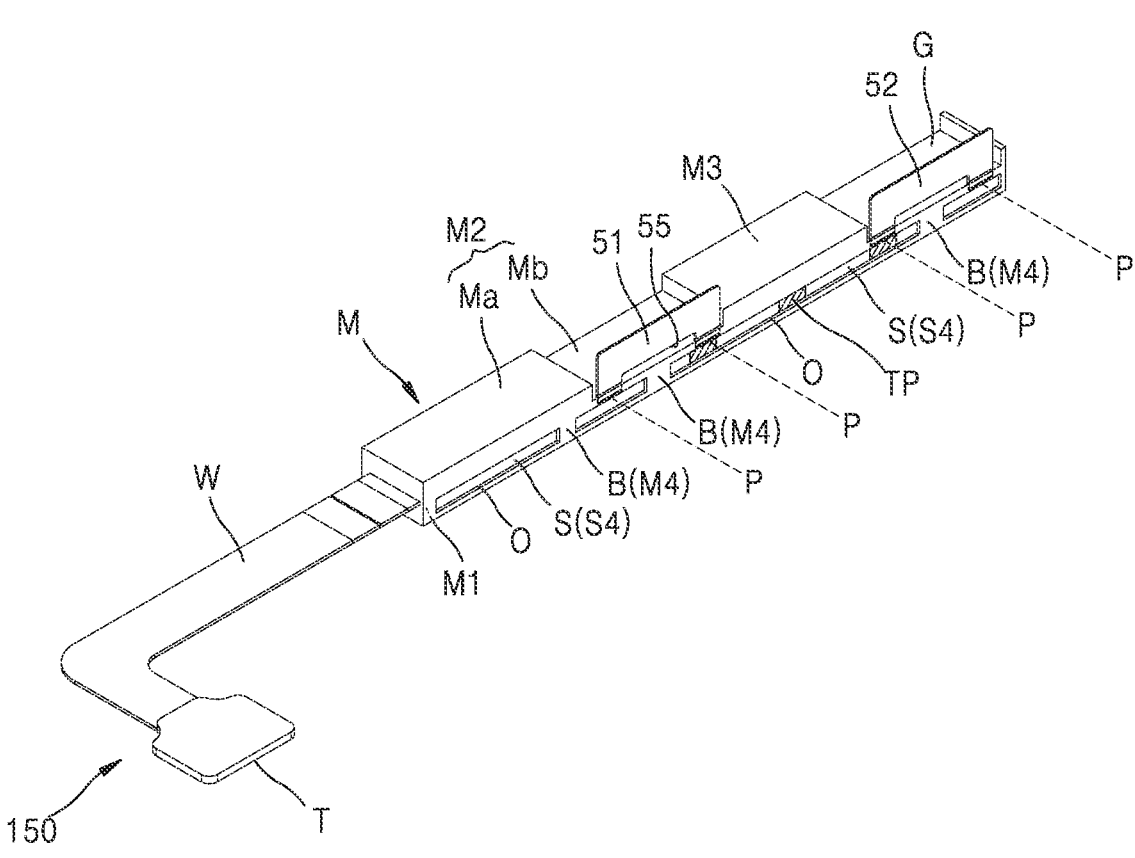
FIG. 5 is a perspective view of a protection module package illustrated in FIG. 4 according to some embodiments.
Figure 6:
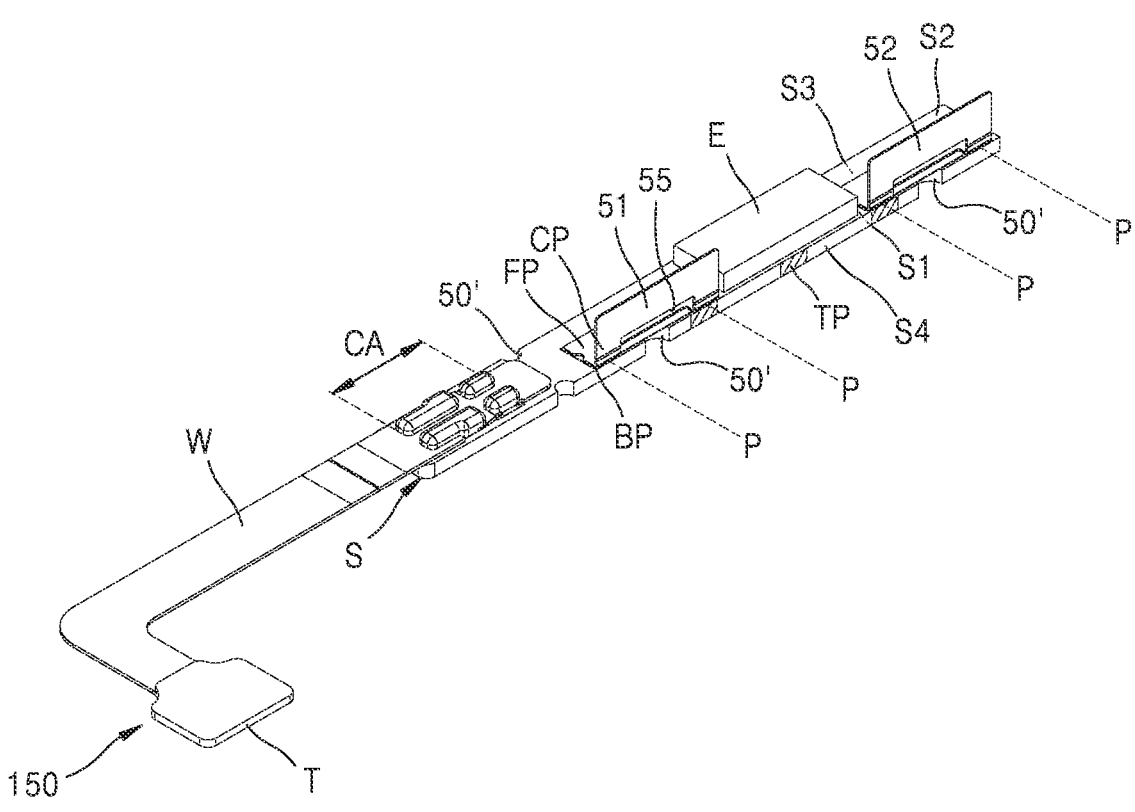
FIG. 6 is a perspective view of a circuit board as a part of the protection module package illustrated in FIG. 5 according to some embodiments.
Figure 7:
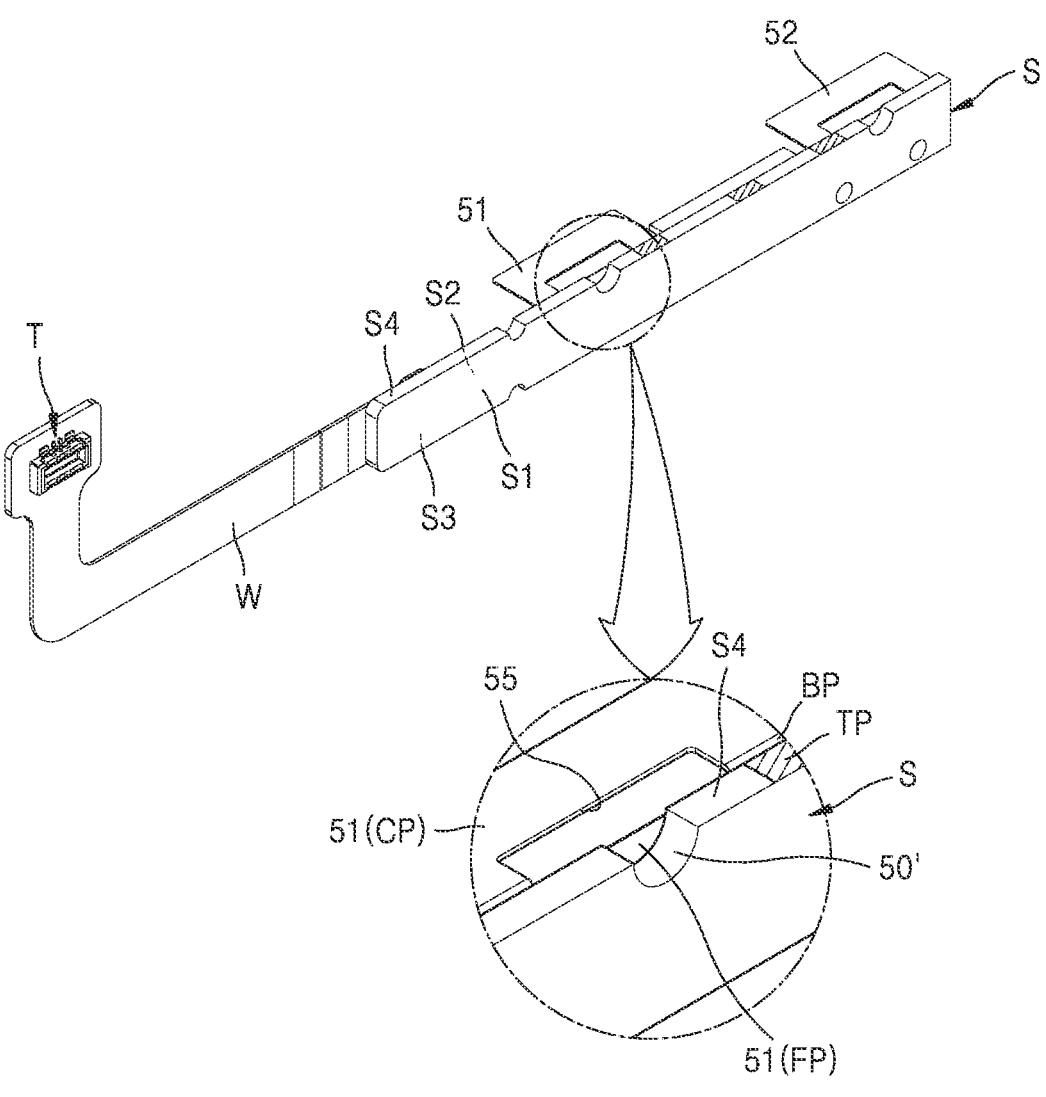
FIG. 7 is a perspective view of the circuit board illustrated in FIG. 6 viewed from another angle according to some embodiments.

FIG. 4 is an exploded perspective view of a battery pack according to some embodiments. FIG. 5 is a perspective view of a protection module package illustrated in FIG. 4. FIG. 6 is a perspective view of a circuit board as a part of the protection module package illustrated in FIG. 5. FIG. 7 is a perspective view of the circuit board illustrated in FIG. 6 viewed from another angle.

Referring to FIGS. 4 to 7, a battery pack according to some embodiments may include the battery cell 10 including the main body 10a including the electrode assembly A, and the terrace part 10b1 from which the electrodes 11 and 12 connected to the electrode assembly A are drawn out, and a protection module package 150 seated on the terrace part 10b1 of the battery cell 10 and electrically connected to the battery cell 10, and the protection module package 150 may include the circuit board S including the first surface S1 facing the terrace part 10b1 of the battery cell 10, the second surface S2 opposite to the first surface S1, the third surface S3, which is between the first and second surfaces S1 and S2 and faces the main body 10a, and the fourth surface S4 opposite to the third surface S3 and on which the test port TP is formed, and an insulating block M covering at least one of the first to fourth surfaces S1, S2, S3, and S4 of the circuit board S.

According to some embodiments, the insulating block M may include a side surface formed with two or more bridges B extending across the fourth surface S4 in the longitudinal direction of the circuit board S with a long hole O therebetween, so as to cover the first and second surfaces S1 and S2 and expose a portion of the fourth surface S4 on which the test port TP is formed. The battery pack according to some embodiments may further include the connection tabs 51 and 52, which connect the battery cell 10 and the circuit board S to each other and are arranged on the second surface S2 to be drawn out from an edge that is in contact with the fourth surface S4.

The circuit board S may include the first surface S1 facing the terrace part 10b1 of the battery cell 10 and the second surface S2 opposite to the first surface S1, the third surface S3 facing the main body 10a of the battery cell 10, and the fourth surface S4 opposite to the third surface S3. In addition, the connection tabs 51 and 52 electrically connected to the battery cell 10, and the circuit elements E may be arranged on the second surface S2, which may enable insulation from the battery cell 10, rather than on the first surface S1 facing the terrace part 10b1 of the battery cell 10 and the third surface S3 facing the main body 10a of the battery cell 10, and the test port TP may be formed on the fourth surface S4, which may enable insulation from the battery cell 10 and being accessed from the outside of the battery pack.

However, according to some embodiments, the circuit components including the connection tabs 51 and 52 and the circuit elements E may be mounted mainly on the second surface S2, but may also be mounted on the first surface S1, the third surface S3, or the fourth surface S4 in order to secure an extra mounting space. According to some embodiments, the test port TP may be formed on the fourth surface S4 of the circuit board S in which electrical or physical interference with the battery cell 10 may be minimized, and even in this case, the test port TP may not form a shape protruding from the fourth surface S4 of the circuit board S, and may be formed as, for example, a thin metal layer formed on the conductive pattern L (see FIG. 3) extending toward the fourth surface S4 of the circuit board S.

According to some embodiments, the insulating block M covering the outer surface of the circuit board S may be formed on the circuit board S. According to some embodiments, first to fourth layers M1, M2, M3, and M4 of the insulating block M may be formed on the first to fourth surfaces S1, S2, S3, and S4 of the circuit board S, respectively, and the insulating block M may cover the first to fourth surfaces S1, S2, S3, and S4 forming the outer surface of the circuit board S.

According to some embodiments, the first and second layers M1 and M2 of the insulating block M may be formed on the first and second surfaces S1 and S2 of the circuit board S that provide mounting spaces for the connection tabs 51 and 52 and the circuit elements E, so as to insulate the connection tabs 51 and 52 and the circuit elements E and protect them from an external environment. The first and second layers M1 and M2 of the insulating block M may entirely cover the first and second surfaces S1 and S2 of the circuit board S.

The insulating block M may entirely cover the third surface S3 of the circuit board S facing the main body 10a of the battery cell 10, and partially cover the fourth surface S4 of the circuit board S opposite to the main body 10a of the battery cell 10 to expose a portion of the fourth surface S4 on which the test port TP is formed. The fourth surface S4 of the circuit board S corresponds to a surface opposite to the main body 10a of the battery cell 10, and the test port TP may be formed on the fourth surface S4 of the circuit board S for the purpose of inspecting the electrical connection state of the circuit board S, checking whether the circuit board S is operating normally, or measuring a voltage of the battery cell 10. In this case, the insulating block M may be formed such that a portion of the fourth surface S4 of the circuit board S on which the test port TP is formed is exposed to allow the test probe to access the test port TP.

According to some embodiments, the connection tabs 51 and 52 may be arranged on the circuit board S, and the connection tabs 51 and 52 may extend from the circuit board S to be drawn out of the insulating block M. According to some embodiments, the connection tabs 51 and 52 may be arranged on the second surface S2 of the circuit board S to be drawn out of the circuit board S, from an edge that is in contact with the fourth surface S4. In this case, the connection tabs 51 and 52 drawn out of the circuit board S may be connected to the electrodes 11 and 12 of the battery cell 10. The connection tabs 51 and 52 may be arranged on the second surface S2 of the circuit board S to be drawn out of the circuit board S, from an edge in which the second surface S2 and the fourth surface S4 are in contact with each other. In this case, the connection tabs 51 and 52 may be drawn out of the circuit board S and the insulating block M surrounding the circuit board S, to be connected, outside the insulating block M, to the electrodes 11 and 12 of the battery cell 10.

According to some embodiments, the connection tabs 51 and 52 may be drawn out of the insulating block M through the tab withdrawal positions P formed in the insulating block M, and may be connected to the electrodes 11 and 12 of the battery cell 10 extending to overlap the connection tabs 51 and 52 drawn out from the insulating block M. That is, the connection tabs 51 and 52 may be drawn out of the insulating block M in a direction parallel to the fourth surface S4 of the circuit board S, and overlap the electrodes 11 and 12 of the battery cell 10 extending in the direction parallel to the fourth surface S4 of the circuit board S while surrounding the insulating block M, to be connected to the electrodes 11 and 12 of the battery cell 10.

The first and second layers M1 and M2 of the insulating block M may be formed on the first and second surfaces S1 and S2 of the circuit board S, respectively. The insulating block M may insulate the circuit board S by covering the first and second surfaces S1 and S2 of the circuit board S, and may protect the circuit board S from an external environment. The insulating block M may be formed of an electrically insulating polymeric resin material, and may be formed as a molded article. The first and second layers M1 and M2 of the insulating block M may be formed on the first and second surfaces S1 and S2 of the circuit board S, respectively, may entirely cover the first and second surfaces S1 and S2 of the circuit board S, and may completely cover the first and second surfaces S1 and S2 of the circuit board S such that the first and second surfaces S1 and S2 are not exposed to the outside. The first and second surfaces S1 and S2 of the circuit board S provide mounting spaces for the connection tabs 51 and 52 and the circuit elements E, and thus, the first and second layers M1 and M2 of the insulating block M may completely cover the first and second surfaces S1 and S2 of the circuit board S, and insulate the connection tabs 51 and 52 and the circuit elements E not to be exposed to the outside.

The first layer M1 of the insulating block M may be formed to have a uniform thickness in the thickness direction of the circuit board S. That is, the first layer M1 of the insulating block M may be formed to have a uniform thickness (or relatively uniform thickness) in the longitudinal direction of the circuit board S, and accordingly, the first layer M1 may have a flat surface. The insulating block M may cover the first surface S1 of the circuit board S facing the terrace part 10b1 of the battery cell 10, and thus prevent electrical interference between the battery cell 10 and the circuit board S.

In the second layer M2 of the insulating block M, avoidance grooves G having a width for accommodating the connection tabs 51 and 52 in the longitudinal direction of the circuit board S may be formed. For example, the avoidance grooves G are formed at positions overlapping the connection tabs 51 and 52 in the longitudinal direction of the circuit board S, and the width of the avoidance grooves G may be greater than or equal to at least the width of the connection tabs 51 and 52.

The avoidance grooves G may be formed for the purpose of avoiding interference between the insulating block M and the connection tabs 51 and 52 drawn out from the insulating block M, and, for example, may be formed for the purpose of avoiding physical interference between the insulating block M and the connection tabs 51 and 52 drawn out from the insulating block M, or preventing damage to the insulating block M in welding the connection tabs 51 and 52 with the electrodes 11 and 12 of the battery cell 10. In addition, the avoidance grooves G may provide position alignment marks for alignment between the connection tabs 51 and 52 and the electrodes 11 and 12 of the battery cell 10 connected to each other. The connection tabs 51 and 52 and the electrodes 11 and 12 of the battery cell 10 may be connected to each other at positions of the avoidance grooves G in the longitudinal direction of the circuit board S. According to some embodiments, the connection tabs 51 and 52 drawn out from the insulating block M may be bent together with the electrodes 11 and 12 of the battery cell 10 and then seated on the avoidance grooves G.

The connection tabs 51 and 52 may include the first and second connection tabs 51 and 52 connected to the first and second electrodes 11 and 12 of the battery cell 10, respectively, and a pair of avoidance grooves G may be formed to have a width for accommodating the first and second connection tabs 51 and 52, such that the pair of avoidance grooves G may be formed in the second layer M2 of the insulating block M to be spaced apart from each other in the longitudinal direction of the circuit board S.

According to some embodiments, the second layer M2 of the insulating block M may include a thin portion Mb and a thick portion Ma stepped with respect to each other in the thickness direction of the circuit board S. In addition, the avoidance groove G may be provided through the stepped portion between the thin portion Mb and the thick portion Ma. According to some embodiments, the second layer M2 of the insulating block M includes the thin portion Mb formed to have a relatively low thickness in the thickness direction of the circuit board S, and a thick portion Ma formed to have a relatively high thickness. As described above, the avoidance groove G may be provided through the stepped portion between the thin portion Mb and the thick portion Ma formed to have different thicknesses.

The third layer M3 of the insulating block M may be formed on the third surface S3 of the circuit board S. The insulating block M may insulate the circuit board S by covering the third surface S3 of the circuit board S, and may protect the circuit board S from an external environment. That is, the insulating block M may cover the third surface S3 of the circuit board S facing the main body 10a of the battery cell 10, and thus prevent electrical interference between the battery cell 10 and the circuit board S. For example, a metal film of the casing H may be exposed through the cross section of the side sealing part 10b2 folded toward the main body 10a of the battery cell 10, and the third surface S3 of the circuit board S facing the main body 10a of the battery cell 10 may be entirely covered by the third layer M3 of the insulating block M to avoid electrical interference between the side sealing part 10b2 and the circuit board S.

By forming the fourth layer M4 of the insulating block M on the fourth surface S4 of the circuit board S, the bridges B of the insulating block M may be formed. The bridges B of the insulating block M may connect the first and second layers M1 and M2 of the insulating block M to each other, and thus prevent the first and second layers M1 and M2 of the insulating block M from being separated from the first and second surfaces S1 and S2 of the circuit board S. That is, the first and second layers M1 and M2 of the insulating block M are connected to each other through the bridges B and support each other, so as to prevent the insulating block M from being broken or damaged and improve the resistance of the insulating block M against external impact. The bridges B of the insulating block M may extend across the fourth surface S4 of the circuit board S to partially cover the fourth surface S4 of the circuit board S and expose a portion of the fourth surface S4 on which the test port TP is formed.

The bridges B may extend across the fourth surface S4 in the thickness direction of the circuit board S to connect the first and second layers M1 and M2 of the insulating block M to each other. In this case, the bridges B may include two or more bridges B extending across the fourth surface S4 from positions away from each other in the longitudinal direction of the circuit board S, and a portion of the fourth surface S4 of the circuit board S, that is, a portion of the fourth surface S4 of the circuit board S on which the test port TP is formed may be exposed to the outside through the long hole O formed between the bridges B spaced apart from each other in the longitudinal direction of the circuit board S. According to some embodiments, by exposing a portion of the fourth surface S4 of the circuit board S to the outside through the long hole O, it may be possible to allow the test probe to access the test port TP formed on the fourth surface S4 of the circuit board S, and by allowing the test probe to be in electrical contact with the test port TP, it may be possible to inspect the electrical connection state of the circuit board S, check whether the circuit board S operates normally, and measure a voltage of the battery cell 10 that does not pass through the circuit board S.

Regarding the formation positions of the bridges B, the bridges B may be formed at positions spaced apart from each other in the longitudinal direction of the circuit board S with the long hole O therebetween. That is, according to some embodiments, the bridges B and the long holes O may be formed alternately with each other in the longitudinal direction of the circuit board S, and may be formed at mutually exclusive positions. For example, the long hole O may correspond to a separation between the bridges B adjacent to each other in the longitudinal direction of the circuit board S, and may correspond to a position through which a portion of the circuit board S is exposed outside the bridges B. The long hole O exposes a portion of the fourth surface S4 of the circuit board S to the outside of the insulating block M and thus allows access to the test port TP formed on the fourth surface S4 of the circuit board S, and, through electrical contact between the test port TP and the test probe, it may be possible to inspect the electrical connection state of the circuit board S, check whether the circuit board S operates normally, and measure a voltage of the battery cell 10 that does not pass through the circuit board S.

The bridge B may be formed to penetrate a recess 50' formed on the fourth surface S4 of the circuit board S. The bridges B may be formed at local positions on the fourth surface S4 of the circuit board S in the longitudinal direction of the circuit board S, to connect the first and second layers M1 and M2 of the insulating block M formed on the first and second surfaces S1 and S2 of the circuit board S to each other, may be formed to have a sufficient cross-sectional area to securely connect the first and second layers M1 and M2 to each other, and may be formed to have a sufficient cross-sectional area to fill the recess 50' formed in the circuit board S.

According to some embodiments, the recess 50' in an inwardly concave shape may be formed on the fourth surface S4 of the circuit board S, and the recess 50' may include a concave curved surface formed to be rounded toward the inside of the circuit board S. For example, the recess 50' may include a curved surface in the shape of a circumferential surface having a height corresponding to the thickness of the circuit board S.

According to some embodiments, the long holes O may be formed at positions overlapping the tab withdrawal positions P. In this case, it may be possible to check whether the connection tabs 51 and 52 are abnormal, through the long holes O formed at the positions overlapping the tab withdrawal positions P. According to some embodiments, by exposing a portion of the fourth surface S4 of the circuit board S through the long hole O, the test port TP formed on the fourth surface S4 of the circuit board S may be exposed to the outside, and it may be possible to check whether the connection tabs 51 and 52 or the circuit elements E on the circuit board S are abnormal, or provide convenience for maintenance, such as repair or replacement.

The bridges B (or the recesses 50' filled with the bridges B) may be formed at a plurality of positions in the longitudinal direction of the circuit board S. According to some embodiments, the bridge B may be formed between a pair of tab withdrawal positions P from which the first connection tab 51 is drawn out, and may be formed between a pair of tab withdrawal positions P from which the second connection tab 52 is drawn out. In addition, the bridge B may be formed between the first connection tab 51 and the flexible wiring W in the longitudinal direction of the circuit board S. According to some embodiments, the flexible wiring W may be connected to one end of the circuit board S in the longitudinal direction of the circuit board S, and the bridge B may be formed between the flexible wiring W and the first connection tab 51 adjacent to the end of the circuit board S to which the flexible wiring W is connected. In this case, a connection state between the flexible wiring W and the circuit board S may be checked through the long hole O adjacent to the bridge B.

The connection tabs 51 and 52 electrically connected to the battery cell 10 may be arranged on the circuit board S. According to some embodiments, the connection tabs 51 and 52 may be arranged on the second surface S2 of the circuit board S to be drawn out of the circuit board S, from an edge that is in contact with the fourth surface S4. In this case, the connection tabs 51 and 52 may be drawn out of the circuit board S in a direction parallel to the fourth surface S4 of the circuit board S, and overlap the electrodes 11 and 12 of the battery cell 10 extending in the direction parallel to the fourth surface S4 of the circuit board S while surrounding the circuit board S, to be connected to the electrodes 11 and 12 of the battery cell 10.

Each of the connection tabs 51 and 52 may include the fixed piece FP fixed on the second surface S2 of the circuit board S, and the coupling piece CP arranged on a different plane from the fixed piece FP through the bent piece BP. The electrodes 11 and 12 of the battery cell 10 extending while surrounding the circuit board S may be coupled to the coupling piece CP.

For example, the fixed pieces FP of the connection tabs 51 and 52 may be arranged on a plane parallel to the second surface S2, and the coupling pieces CP of the connection tabs 51 and 52 may be arranged on a plane parallel to the fourth surface S4. The bent piece BP may be bent such that the fixed piece FP and the coupling piece CP are arranged on different planes, and form the tab withdrawal positions P drawn out of the circuit board S. A pair of bent pieces BP may be formed with the cut-out part 55 therebetween considering ease of bending. In this case, the cut-out part 55 may allow the bent pieces BP to be relatively easily bent, and improve the flow of a molten resin forming the insulating block M through the cut-out part 55, such that the recess 50' formed between the bent pieces BP (or the tab withdrawal positions P formed by the bent pieces BP) is well filled, and the bridges B are formed to have a rigid structure.

Although the disclosure has been described with reference to the embodiments illustrated in the accompanying drawings, the embodiments are merely examples, and those of skill in the art to which the disclosure pertains may understand that various modifications and equivalent other embodiments may be derived therefrom.

According to some embodiments of the disclosure, there may be provided a battery pack with sufficient mounting spaces for circuit components, such as connection tabs or circuit elements, and including a test port that enables various purposes, such as inspecting an electrical connection state, checking a normal operation, or measuring a voltage of a battery cell.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims, and their equivalents.

What is claimed is:

1. A battery pack, comprising:
a battery cell comprising a main body comprising an electrode assembly, and a terrace part from which electrodes connected to the electrode assembly are drawn out; and
a protection module package seated on the terrace part of the battery cell and electrically connected to the battery cell,
wherein the protection module package comprises:
a circuit board comprising:
a first surface facing the terrace part of the battery cell;
a second surface opposite to the first surface;
a third surface, which is between the first and second surfaces and faces the main body of the battery cell; and
a fourth surface opposite to the third surface and on which a test port is formed; and
a connection tab connecting the battery cell to the circuit board.

2. The battery pack of claim 1, wherein the first to fourth surfaces of the circuit board extend in a longitudinal direction of the circuit board, and comprise different adjacent surfaces to be in contact with each other.

3. The battery pack of claim 1, wherein
the first and second surfaces of the circuit board form main surfaces of the circuit board occupying a first area, and
the third and fourth surfaces of the circuit board form side surfaces of the circuit board occupying a second area smaller than the first area.

4. The battery pack of claim 1, wherein the connection tab and a circuit element are mounted on at least one of the first and second surfaces of the circuit board.

5. The battery pack of claim 1, wherein the connection tab is on the second surface of the circuit board and is drawn out from an edge that is in contact with the fourth surface of the circuit board.

6. The battery pack of claim 1, wherein a thickness of the test port formed on the fourth surface of the circuit board is less than a thickness of a circuit element formed on the second surface of the circuit board.

7. The battery pack of claim 1, wherein the test port comprises a metal layer connected to a conductive pattern extending toward the fourth surface of the circuit board, among a plurality of conductive patterns formed on the circuit board.

8. The battery pack of claim 1, wherein the test port comprises a plating layer formed on an end of a conductive pattern that extends toward the fourth surface of the circuit board.

9. The battery pack of claim 1, further comprising
an input/output port for input/output of a charging/discharging current of the battery cell with respect to an external device connected to the battery pack,
wherein the test port is formed in a shape different from a shape of the input/output port.

10. The battery pack of claim 9, wherein the test port is formed to have a smaller area than an area of the input/output port.

11. The battery pack of claim 9, wherein the input/output port is formed at an end of a flexible wiring that extends from the circuit board in a longitudinal direction of the circuit board.

12. The battery pack of claim 11, wherein a connection area with the circuit board is formed at a first end of the flexible wiring, and the input/output port is formed at a second end of the flexible wiring.

13. The battery pack of claim 12, wherein the connection area is formed on any one of the first and second surfaces of the circuit board.

14. The battery pack of claim 1, wherein the protection module package further comprises an insulating block covering at least one of the first to fourth surfaces of the circuit board.

15. The battery pack of claim 14, wherein the insulating block comprises a side surface formed with a plurality of bridges extending across the fourth surface in a longitudinal direction of the circuit board with long holes therebetween, to cover the first and second surfaces and expose a portion of the fourth surface on which the test port is formed.

16. The battery pack of claim 15, wherein the insulating block comprises first to fourth layers formed on the first to fourth surfaces of the circuit board, respectively.

17. The battery pack of claim 16, wherein the first to third layers of the insulating block entirely cover the first to third surfaces of the circuit board.

18. The battery pack of claim 16, wherein the fourth layer of the insulating block comprises the plurality of bridges connecting the first and second layers of the insulating block to each other.

19. The battery pack of claim 18, wherein the plurality of bridges and the long holes are alternately formed in a longitudinal direction of the circuit board.

20. The battery pack of claim 19, wherein the test port is exposed from the insulating block through the long holes.

* * * * *